E. WERNDL.
STEERING GEAR.
APPLICATION FILED AUG. 13, 1909.
986,882. Patented Mar. 14, 1911.
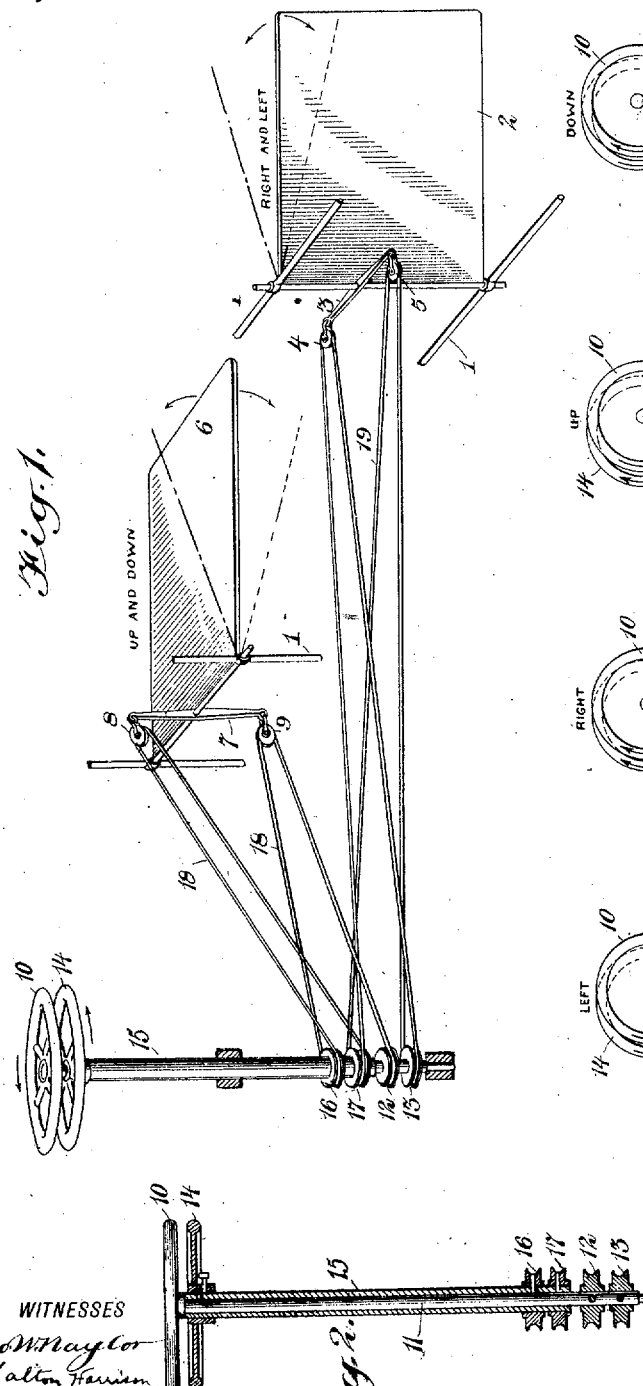
INVENTOR
Ernst Werndl
BY
ATTORNEYS
WITNESSES

UNITED STATES PATENT OFFICE.

ERNST WERNDL, OF PYRACH POST GARSTEN, NEAR STEYR, AUSTRIA-HUNGARY.

STEERING-GEAR.

986,882.

Specification of Letters Patent. Patented Mar. 14, 1911.

Application filed August 13, 1909. Serial No. 512,667.

*To all whom it may concern:*

Be it known that I, ERNST WERNDL, a subject of the Emperor of Austria-Hungary, and a resident of Pyrach Post Garsten, near Steyr, Austria-Hungary, have invented a new and Improved Steering-Gear, of which the following is a full, clear, and exact description.

My invention relates to steering gears, my more particular purpose being to provide a steering gear suitable for air ships, dirigible balloons, and flying machines of all kinds, a further purpose being to provide for turning the craft to right or left and up or down, or to perform any reasonable composition of movements, all by aid of two steering wheels disposed one above the other and in close proximity to each other, these wheels being journaled upon an axis which is fixed relatively to the general framework of the machine.

Reference is to be had to the accompanying drawings forming a part of this specification, in which similar characters of reference indicate corresponding parts in all the figures.

Figure 1 is a perspective showing my steering gear applied to the framework of a heavier-than-air flying machine; Fig. 2 is a detail showing in section the two steering wheels and the shafts upon which they are mounted, one of these shafts being tubular and the other being concentric with it; and Figs. 3 to 10 inclusive are diagrams indicating the various motions and positions of the two steering wheels whereby they are enabled, through control of the rudders, to bring the machine under control of the operator.

The general framework is shown at 1.

At 2 is a rudder mounted to swing in a plane horizontal to the normal position of the machine. The tiller lever 3 is connected rigidly with the rudder 2 and is used for turning the latter. Mounted upon opposite ends of the lever 3 are pulleys 4, 5. At 6 is another rudder which, however, is journaled to move in a plane vertical as compared with the normal position of the machine. Connected rigidly with this rudder 6 is a tiller lever 7 carrying at its ends pulleys 8, 9. A steering wheel 10 is mounted upon a steering shaft 11 and secured rigidly upon the latter are pulleys 12, 13. At 14 is another steering wheel disposed immediately below the steering wheel 10 and parallel with the same. The steering wheel 14 is mounted rigidly upon a tubular shaft 15, the latter carrying two pulleys 16, 17, which are rigid upon it.

At 18 is a cord, or other flexible connection, which engages and passes partially around the various pulleys 8, 9, 12 and 16, so as to enable motion of the pulleys 12, 16 to turn the rudder 6.

At 19 is a cord, or other flexible connection, which passes partially around the various pulleys 4, 5, 13, 17, so as to enable the pulleys 13, 17 to turn the rudder 2.

The operation of my device is as follows: So long as both rudders 2 and 6 are stationary, the steering wheels 10, 14 are likewise stationary. In order, however, to turn either or both of the rudders, the wheels 10, 14 are manipulated accordingly. For instance, if the operator desires that the machine be turned to the left while still maintaining its position relatively to the level of the earth, he turns both steering wheels 10, 14 in a contraclockwise direction, as indicated in Fig. 3. Following the movements of the pulleys 12, 16, and of the cord 18 actuated thereby, it will be seen that while the pulleys 8, 9 are turned, the tiller lever 7 is not shifted in its position and consequently the rudder 6 remains stationary. Not so, however, with the rudder 2, which is shifted to the left—that is, in a clockwise direction, as seen from above. Suppose, now, that the operator wishes to turn the machine to the right. He turns the steering wheels 10, 14 in a clockwise direction, as indicated in Fig. 4. This swings the rudder 2 slightly in a contraclockwise direction and turns the machine accordingly. If the operator desires that the machine move upwardly, he turns the upper steering wheel 10 in a contraclockwise direction and the lower steering wheel 14 in a clockwise direction. The movements of the cord 19 in this case are such that the pulleys 4, 5 simply turn upon their respective axes without shifting the position of the tiller lever 3 and without turning the rudder 2. The rudder 6 and tiller lever 7, however, are turned so that the outer or free end of the rudder 6 is raised. In order for the machine to descend—that is, glide gradually downward—the steering wheel 10 is turned in a clockwise direction and the steering wheel 14 in a contraclockwise direction, as indicated in Fig. 6. Composite movements of the machine may in certain instances be effected by a simple rotation of one of the steering wheels. For instance, as indicated in Fig. 7, if the steering wheel 10 be turned in a contraclockwise direction, the steering wheel 14 meanwhile remaining undisturbed, the rudder 6 is moved so that its outer or free end rises and at the same time the rudder 2 swings in a clockwise direction, as seen from above, the result being that the machine turns to the left and glides upwardly. If the steering wheel 10 remains undisturbed and the steering wheel 14 be turned in a clockwise direction, the machine turns to the right and glides upwardly, as indicated in Fig. 8. If the steering wheel 14 be turned in a clockwise direction, as indicated in Fig. 9, the machine turns to the left and at the same time glides downwardly. If the steering wheel 14 remains undisturbed and the steering wheel 10 be turned in a clockwise direction, as indicated in Fig. 10, the machine turns to the right and at the same time glides downwardly.

It will be noted that when both steering wheels 10, 14 are turned in the same direction, as indicated, for instance, in Fig. 3, or in Fig. 4, the various pulleys 8, 9, 12 and 16, while turning in response to the rotative effect given the steering wheel, do not disturb the rudder 6 because the movement is compensated by mere rotation of the pulleys and no pull is exerted upon the tiller lever 7. The mechanism connected with the steering wheels 10, 14, for the purpose of actuating the rudders, is, therefore, essentially a differential gearing. The steering wheels 10, 14 are about an inch apart, and being thus close together may be held with one hand.

I do not limit myself to the particular kind of craft upon which my steering gear is to be used. Neither do I limit myself to the particular arrangement here shown for enabling the steering wheels, or their equivalents, to turn the rudders. Neither do I limit myself to the particular type of gearing herein shown, as other kinds of differential gearing may be substituted therefor without departing from the spirit of my invention.

Having thus described my invention, I claim as new and desire to secure by Letters Patent:

1. In a steering gear, the combination of a pair of steering wheels, one disposed directly over the other and in close proximity to the same, gearing in operative relation to both of said wheels, and a steering member connected with said gearing and controllable thereby.

2. In a steering gear, the combination of a pair of steering wheels, one of said steering wheels being disposed directly over the other and in close proximity thereto, a pair of steering members mounted to move in different planes, and gearing connected with both of said steering members and also with both of said steering wheels for the purpose of enabling movements of said steering wheels to actuate said steering members independently of each other.

3. In a steering gear, the combination of a steering shaft, a steering wheel connected rigidly therewith for turning the same, a second steering shaft having a tubular form and encircling said first-mentioned steering shaft, a steering wheel connected rigidly with said second-mentioned steering shaft, a rudder, and mechanism connected with said rudder and with both of said steering shafts and controllable by the joint action thereof for the purpose of moving said rudder.

4. In a steering gear, the combination of a pair of steering wheels movable independently of each other and mounted to turn upon a single axis which always remains normal to the plane occupied by the steering wheel, a rudder, and gearing connected with said rudder and controllable by the joint action of both of said steering wheels.

5. The combination of a rudder, a tiller lever for actuating the same, pulleys mounted upon the opposite ends of said tiller lever and movable bodily with said tiller lever as the latter is rocked, a plurality of revoluble shafts, pulleys mounted upon the same, a cord engaging said last-mentioned pulleys and also engaging said pulleys upon said tiller lever, and means controllable at will for turning said last-mentioned pulleys independently of each other.

6. The combination of a framework, a rudder journaled thereupon and adapted to swing, gearing mounted upon said framework and connected with said rudder for the purpose of actuating the latter, a pair of shafts connected with said gearing for the purpose of controlling the same, and a pair of steering wheels each being connected with one of said shafts, said steering wheels being mounted to turn in planes which are fixed relatively to the general position of said framework.

In testimony whereof I have signed my name to this specification in the presence of two subscribing witnesses.

ERNST WERNDL.

Witnesses:
  WALTON HARRISON,
  PHILIP D. ROLLHAUS.